(12) United States Patent
Fujimoto

(10) Patent No.: US 10,887,133 B2
(45) Date of Patent: Jan. 5, 2021

(54) WIRELESS GATEWAY SYSTEM AND COMMUNICATION METHOD THEREOF

(71) Applicant: YOKOGAWA ELECTRIC CORPORATION, Tokyo (JP)

(72) Inventor: Naoyuki Fujimoto, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 24 days.

(21) Appl. No.: 15/986,249

(22) Filed: May 22, 2018

(65) Prior Publication Data

US 2018/0343147 A1 Nov. 29, 2018

(30) Foreign Application Priority Data

May 24, 2017 (JP) ................................. 2017-102696

(51) Int. Cl.
| | |
|---|---|
| *H04L 12/66* | (2006.01) |
| *H04L 29/08* | (2006.01) |
| *H04L 29/06* | (2006.01) |
| *H04B 7/14* | (2006.01) |
| *H04W 88/16* | (2009.01) |

(52) U.S. Cl.
CPC ............... *H04L 12/66* (2013.01); *H04B 7/14* (2013.01); *H04L 67/12* (2013.01); *H04L 67/2823* (2013.01); *H04L 69/08* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2006/0268329 A1* | 11/2006 | Lo .......................... | G06F 3/0231 |
| | | | 358/1.15 |
| 2007/0122086 A1* | 5/2007 | Lin ........................ | H04B 10/40 |
| | | | 385/88 |
| 2013/0188557 A1 | 7/2013 | Gotou | |
| 2015/0181647 A1 | 6/2015 | Takahashi | |
| (Continued) | | | |

FOREIGN PATENT DOCUMENTS

| | | |
|---|---|---|
| EP | 1343253 A1 | 9/2003 |
| EP | 3018885 A1 | 5/2016 |
| JP | 2013-152538 A | 8/2013 |

*Primary Examiner* — Jutai Kao
(74) *Attorney, Agent, or Firm* — Osha Bergman Watanabe & Burton LLP

(57) ABSTRACT

A wireless gateway system includes a gateway apparatus having a gateway function and including an antenna that wirelessly communicates with a wireless field device, and a power supply apparatus separated from the gateway apparatus. The power supply apparatus converts a voltage from an external power supply to a predetermined internal voltage, supplies the internal voltage to the gateway apparatus, and relays a wired signal in conformance with a first wired communication protocol between an external controller and the gateway apparatus. The gateway apparatus operates using the internal voltage supplied from the power supply apparatus, converts a wireless signal in conformance with a wireless communication protocol received from the wireless field device to a wired signal in conformance with the first wired communication protocol, and transmits the converted wired signal to the power supply apparatus.

11 Claims, 5 Drawing Sheets

(56) References Cited

U.S. PATENT DOCUMENTS

| | | | |
|---|---|---|---|
| 2016/0034732 A1* | 2/2016 | Cho | G06K 7/10366 |
| | | | 340/10.1 |
| 2017/0033602 A1* | 2/2017 | Zhang | H02H 11/002 |
| 2018/0063929 A1* | 3/2018 | O'Neil | H05B 37/0272 |
| 2018/0220505 A1* | 8/2018 | Silverman | H05B 33/0869 |

* cited by examiner

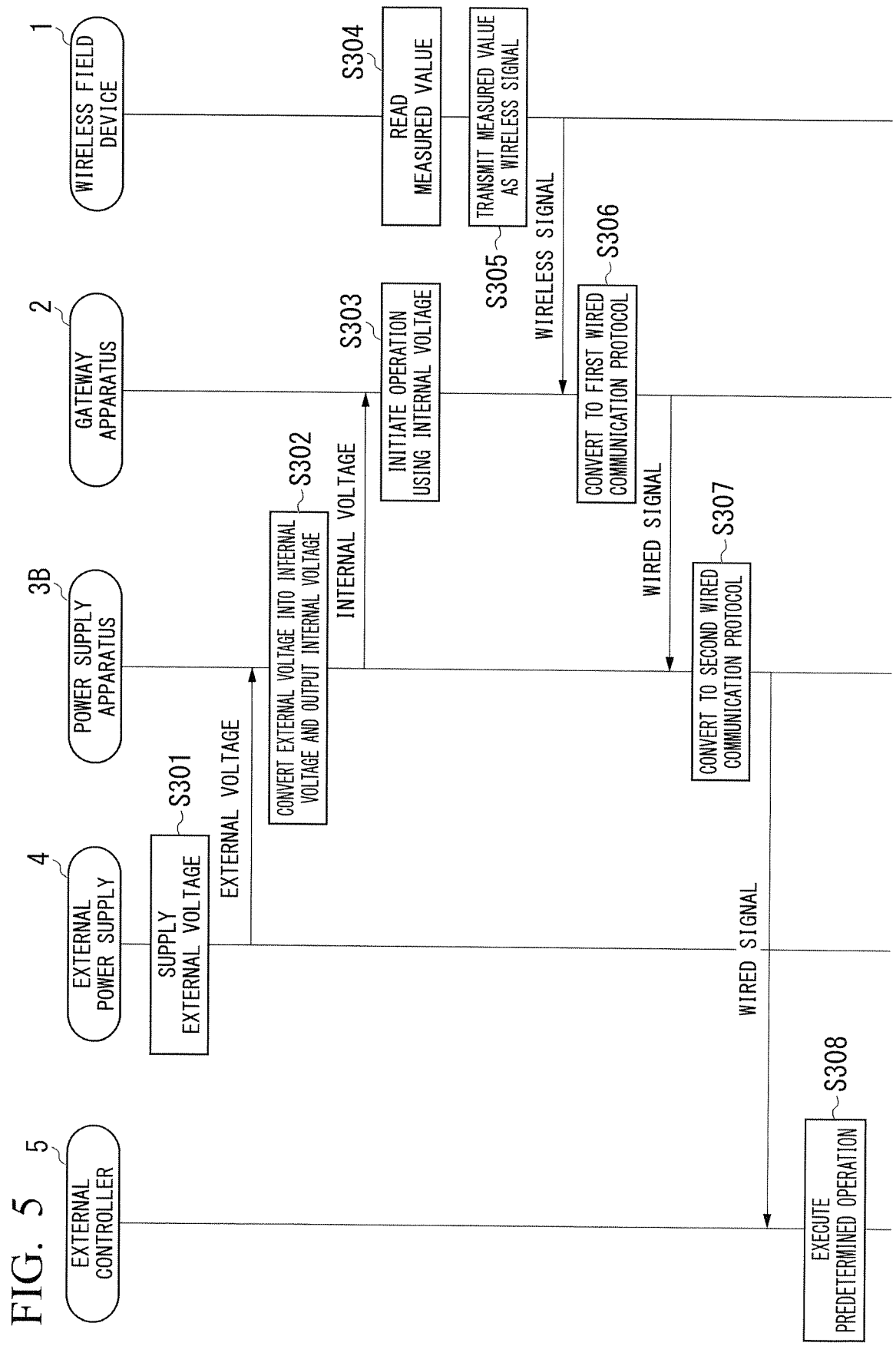

WIRELESS GATEWAY SYSTEM AND COMMUNICATION METHOD THEREOF

CROSS-REFERENCE TO RELATED APPLICATIONS

The present U.S. patent application claims priority to Japanese patent application No. 2017-102696, filed on May 24, 2017, according to the Paris Convention, the entirety of which is incorporated herein by reference.

BACKGROUND

Technical Field

The present invention relates to a wireless gateway system and a communication method thereof.

Related Art

Japanese Unexamined Patent Application, First Publication No. 2013-152538 discloses a wireless gateway apparatus having a so-called gateway function of converting a wireless signal from a wireless field device, received through an antenna, into a signal in conformance with a wired protocol and transmitting the converted signal to an external controller. This wireless gateway apparatus can execute the gateway function by being driven by power supplied from an external power supply.

(1) and (2) described below may be conceived as installation locations of the wireless gateway apparatus.

(1) There are some cases in which the wireless gateway apparatus including the antenna is installed at a high location in order to enable satisfactory communication with wireless field devices.

(2) There are some cases in which the wireless gateway apparatus along with an external controller is installed at a low location and only the antenna is installed at a high location in consideration of maintainability.

A wireless gateway apparatus is generally large and heavy because it needs to have a power supply circuit and to conform to explosion-proof requirements for industrial plants. Accordingly, a heavy fastener is used to fasten such a wireless gateway apparatus in a high location as in the aforementioned installation method (1) and thus expensive materials are required. Furthermore, a workload for installation in a high location is high.

On the other hand, in a case in which a cable is lengthened in order to install only the antenna in a high location as in the aforementioned installation method (2), high-frequency wireless signals flowing through the cable are degraded and thus the wireless communication performance between the antenna and wireless field devices decreases.

SUMMARY

One or more embodiments of the present invention provide a wireless gateway system for achieving low costs, reducing a workload for installation, and minimizing deterioration of wireless communication performance with respect to wireless field devices, and a communication method thereof.

A wireless gateway system according to one or more embodiments of the present invention may include a gateway apparatus having a gateway function and including an antenna that wirelessly communicates with a wireless field device, and a power supply apparatus separated from the gateway apparatus. The power supply apparatus may convert a voltage from an external power supply to a predetermined internal voltage, supply the internal voltage to the gateway apparatus, and relay a wired signal in conformance with a first wired communication protocol between an external controller and the gateway apparatus. The gateway apparatus may operate using the internal voltage supplied from the power supply apparatus, convert a wireless signal in conformance with a wireless communication protocol received from the wireless field device to a wired signal in conformance with the first wired communication protocol, and transmit the converted wired signal to the power supply apparatus.

In the above-described wireless gateway system, a first cable that supplies the internal voltage from the power supply apparatus to the gateway apparatus may be wireable between the power supply apparatus and the gateway apparatus.

In the above-described wireless gateway system, the power supply apparatus may further include an overcurrent protection circuit that stops supply of the internal voltage in a case in which the overcurrent protection circuit detects flow of an overcurrent through the first cable.

In the above-described wireless gateway system, the power supply apparatus may further include an insulation circuit that bidirectionally relays the wired signal between the external controller and the gateway apparatus while electrically insulating the external controller from the gateway apparatus.

In the above-described wireless gateway system, the gateway apparatus may convert a wired signal received from the power supply apparatus to a wireless signal and transmit the converted wireless signal to the wireless field device.

In the above-described wireless gateway system, the power supply apparatus may include a signal converter that converts the wired signal received from the gateway apparatus to a wired signal in conformance with a second wired communication protocol different from the first wired communication protocol and relays the converted wired signal to the external controller.

In the above-described wireless gateway system, the gateway apparatus may be positioned higher than the power supply apparatus to enable communication with the wireless field device.

In the above-described wireless gateway system, a second cable that relays the wired signal in conformance with the first wired communication protocol may be wireable between the power supply apparatus and the gateway apparatus.

In the above-described wireless gateway system, the power supply apparatus may include a power supply circuit that converts the voltage from the external power supply to the internal voltage and to supply the internal voltage to the gateway apparatus through the first cable.

In the above-described wireless gateway system, a second cable that relays the wired signal in conformance with the first wired communication protocol may be wireable between the power supply apparatus and the gateway apparatus. The signal converter may convert the wired signal received from the gateway apparatus through the second cable to the wired signal in conformance with the second wired communication protocol and relay the converted wired signal to the external controller.

A communication method of a wireless gateway system including a gateway apparatus having a gateway function and that wirelessly communicates with a wireless field device, and a power supply apparatus separated from the gateway apparatus, the communication method according to one or more embodiments of the present invention may include converting a voltage from an external power supply to a predetermined internal voltage, supplying the internal voltage from the power supply apparatus to the gateway apparatus, converting a wireless signal in conformance with a wireless communication protocol received from the wireless field device to a wired signal in conformance with a first wired communication protocol, transmitting the wired signal from the gateway apparatus to the power supply apparatus, and relaying the wired signal transmitted from the gateway apparatus to the power supply apparatus to an external controller.

In the above-described communication method of the wireless gateway system, a first cable that supplies the internal voltage from the power supply apparatus to the gateway apparatus may be wireable between the power supply apparatus and the gateway apparatus.

The above-described communication method of the wireless gateway system may further include detecting whether an overcurrent flows through the first cable using the power supply apparatus, and stopping supply of the internal voltage in a case in which the flow of the overcurrent through the first cable is detected.

In the above-described communication method of the wireless gateway system, the wired signal transmitted from the gateway apparatus to the power supply apparatus may be relayed to the external controller while electrically insulating the external controller from the gateway apparatus.

The above-described communication method of the wireless gateway system may further include converting a wired signal transmitted from the power supply apparatus to the gateway apparatus to a wireless signal in conformance with the wireless communication protocol, and transmitting the converted wireless signal to the wireless field device.

The above-described communication method of the wireless gateway system may further include converting the wired signal received from the gateway apparatus to the power supply apparatus, to a wired signal in conformance with a second wired communication protocol different from the first wired communication protocol, and relaying the converted wired signal to the external controller.

In the above-described communication method of the wireless gateway system, the gateway apparatus may be positioned higher than the power supply apparatus to enable communication with the wireless field device.

In the above-described communication method of the wireless gateway system, a second cable that relays the wired signal in conformance with the first wired communication protocol may be wireable between the power supply apparatus and the gateway apparatus.

In the above-described communication method of the wireless gateway system, the internal voltage may be supplied from the power supply apparatus to the gateway apparatus through the first cable.

In the above-described communication method of the wireless gateway system, a second cable that relays the wired signal in conformance with the first wired communication protocol may be wireable between the power supply apparatus and the gateway apparatus. The wired signal transmitted from the gateway apparatus to the power supply apparatus through the second cable may be converted to the wired signal in conformance with the second wired communication protocol and the converted wired signal is relayed to the external controller.

As described above, according to one or more embodiments of the present invention, it is possible to achieve low costs, reduce a workload for installation and minimize deterioration of wireless communication performance with respect to wireless field devices.

BRIEF DESCRIPTION OF THE DRAWINGS

FIG. 5 is a diagram for describing an operation for transmitting a measured value obtained by the wireless field device 1 to the external controller 5 according to the second embodiment.

DETAILED DESCRIPTION

Hereinafter, wireless gateway systems and communication methods thereof according to one or more embodiments of the present invention will be described using the drawings.

First Embodiment

Figure 1:
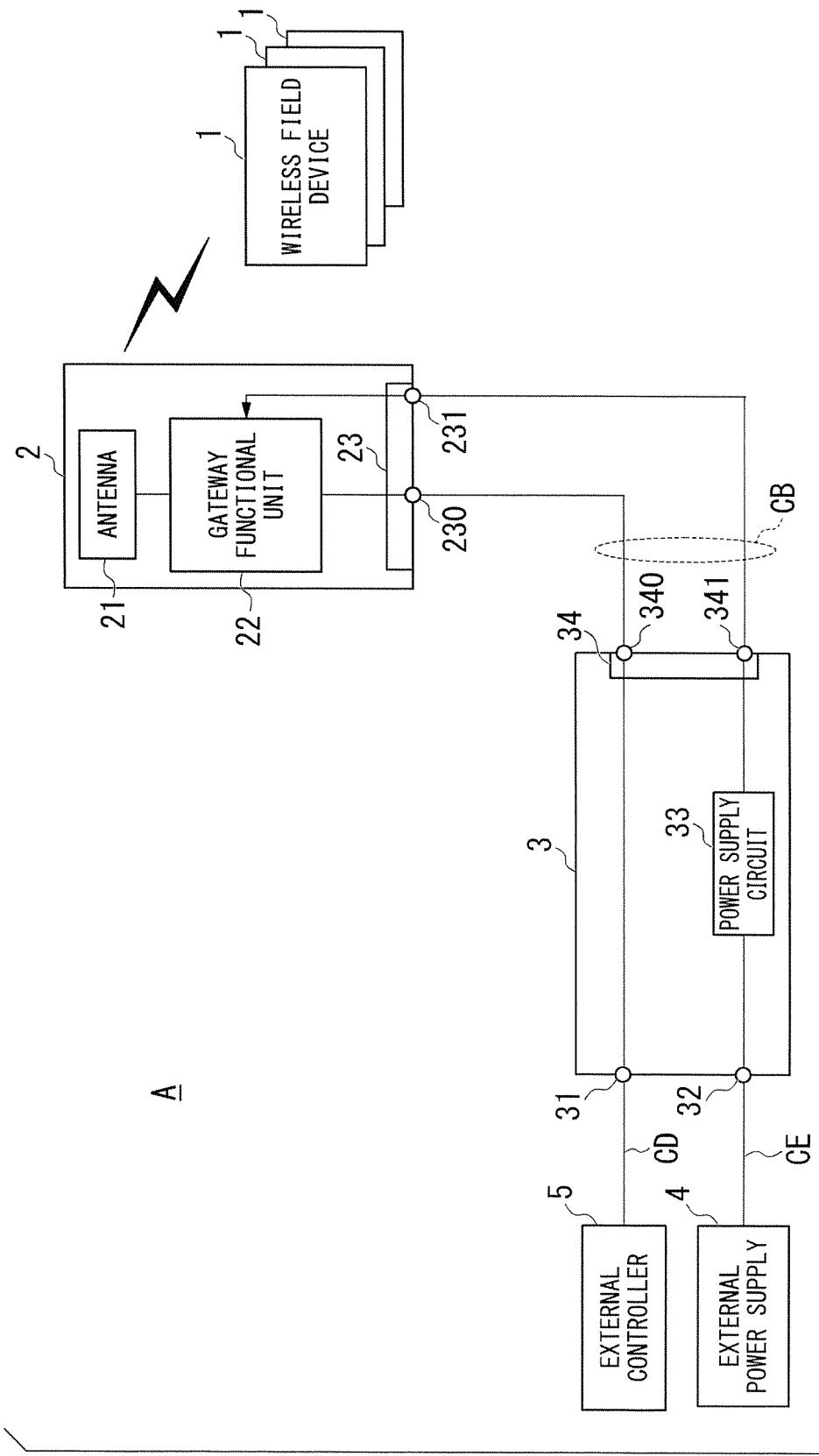
FIG. 1 is a diagram showing an example of a schematic configuration of a wireless communication system A using a wireless gateway system according to a first embodiment.

FIG. 1 is a diagram showing an example of a schematic configuration of a wireless communication system A using a wireless gateway system according to a first embodiment.

The wireless communication system A is constructed in plants, factories and the like (hereinafter, collectively simply referred to as "plants"). The aforementioned plants include plants which manage and control well sites such as gas fields and oilfields and surroundings thereof, plants which manage and control hydroelectric power generation, thermal power generation, nuclear power generation and the like, plants which manage and control energy harvesting such as photovoltaic power generation and wind power generation, plants which manage and control water and sewage, dams and the like, etc. in addition to industrial plants such as chemical plants.

As shown in FIG. 1, the wireless communication system A includes wireless field devices 1, a gateway apparatus 2, a power supply apparatus 3, an external power supply 4, and an external controller 5. The "wireless gateway system" according to one or more embodiments of the present invention includes the gateway apparatus 2 and the power supply apparatus 3.

The wireless field devices 1 perform measurement, operations and the like necessary for process control under the control of the external controller 5. In particular, the wireless field devices 1 include sensor devices such as a flowmeter and a temperature sensor, valve devices such as a flow control valve and an open-close valve, actuator devices such as a fan and a motor, imaging devices which image situations and objects in plants, such as a camera and a video recorder, audio devices which collect abnormal noise in plants or generate an alarm sound, such as a microphone and a speaker, position detection devices which output position information of each of devices, and other devices.

The wireless field devices 1 transmit and receive wireless signals through wireless communication with the gateway apparatus 2. The wireless signals are control signals in conformance with a wireless communication protocol. For example, the wireless communication protocol is ISA100, WirelessHART (registered trademark) or the like.

For example, the wireless field devices 1 may perform a power-saving operation (e.g., intermittent operation) using a battery as a power source and perform wireless communication with the gateway apparatus 2 according to a TDMA system in conformance with wireless communication standard ISA100.11a. The number of wireless field devices 1 wirelessly communicating with the gateway apparatus 2 is arbitrary.

The gateway apparatus 2 is installed at, for example, a high location in order to enable communication with the wireless field devices 1. For example, the gateway apparatus 2 is positioned higher than the power supply apparatus 3 to enable communication with the wireless field devices 1. The gateway apparatus 2 has a gateway function and performs wireless communication with the wireless field devices 1.

The gateway apparatus 2 installed at, for example, a high location is connected to the power supply apparatus 3 installed at, for example, a low location through a cable CB (first cable, second cable). The gateway apparatus 2 performs wired communication with the power supply apparatus 3 through the cable CB. The cable CB is a multicore shielded cable having, for example, a power line, a signal line and a ground line. The cable CB may perform communication using a differential signal (e.g., half-duplex communication). As the cable CB, a serial communication cable in conformance with, for example, RS-485 and the like may be used.

The gateway apparatus 2 may be operated by a voltage (hereinafter, referred to as an "internal voltage") supplied from the power supply apparatus 3 through the cable CB and execute the gateway function. Hereinafter, a schematic configuration of the gateway apparatus 2 according to the first embodiment will be described in detail.

As shown in FIG. 1, the gateway apparatus 2 includes an antenna 21, a gateway functional unit 22 and a connector 23.

The antenna 21 transmits wireless signals to the wireless field devices 1 and receives wireless signals from the wireless field devices 1. In particular, the antenna 21 transmits wireless signals from the gateway functional unit 22, receives wireless signals transmitted from the wireless field devices 1 and inputs the received wireless signals into the gateway functional unit 22.

The gateway functional unit 22 operates using the internal voltage supplied from the power supply apparatus 3 as power, converts control signals (wireless signals) in conformance with a wireless communication protocol, which are received from the wireless field devices 1, to control signals (hereinafter, referred to as "wired signals") in conformance with a wired communication protocol and transmits the converted control signals to the power supply apparatus 3 through the connector 23 and the cable CB. The wired communication protocol may be, for example, a Modbus (registered trademark) protocol, HART (registered trademark) protocol or Foundation FieldBus (registered trademark) protocol.

In addition, the gateway functional unit 22 operates using the internal voltage supplied from the power supply apparatus 3 as power, converts wired signals received from the power supply apparatus 3 to wireless signals and inputs the wireless signals to the antenna 21.

The connector 23 connects the gateway apparatus 2 to the cable CB and is attached to one end of the housing of the gateway apparatus 2. In particular, the connector 23 is screwed to or engaged with an external connector (a connector installed at one end of the cable CB) and thus the gateway apparatus 2 is fixed to and electrically connected to the cable CB.

The connector 23 includes a plurality of connection ten finals 230 and 231.

The connection terminal 230 is a terminal through which wired signals transmitted and received between the gateway apparatus 2 and the power supply apparatus 3 are input and output.

The connection terminal 231 is a terminal through which the internal voltage from the power supply apparatus 3 is received.

A connector suitable for waterproof and dustproof standards such as the International Protection (IP) standard and National Electrical Manufacturers Association (NEMA) standard may be used as the connector 23 because there are some cases in which the gateway apparatus 2 is installed outdoors.

The power supply apparatus 3 is installed at a low location in consideration of maintainability. The power supply apparatus 3 includes connection terminals 31 and 32, a power supply circuit 33 and a connector 34.

The connection terminal 31 is electrically connected to the external controller 5 through a cable CD. The connection terminal 31 is a terminal through which wired signals transmitted and received between the power supply apparatus 3 and the external controller 5 are input and output.

The connection terminal 32 is electrically connected to the external power supply 4 through a cable CE. The connection terminal 32 is a terminal which receives an external voltage from the external power supply 4 through the cable CE.

The power supply circuit 33 converts external power received through the connection terminal 32 into a predetermined voltage to generate an internal voltage. Conversion to the predetermined voltage may be any of voltage boosting and voltage dropping or may be rectification of AC to DC. The predetermined voltage is a voltage by which the gateway apparatus 2 can be operated and may be, for example, a DC voltage of about several V.

The connector 34 connects the power supply apparatus 3 to the cable CB and is attached to one end of the housing of the power supply apparatus 3. In particular, the connector 34 is screwed to or engaged with an external connector (a connector installed at the other end of the cable CB) and thus the power supply apparatus 3 is fixed to and electrically connected to the cable CB.

The connector 34 includes a plurality of connection terminals 340 and 341.

The connection terminal 340 is electrically connected to the connection terminal 230. The connection terminal 340 is a terminal through which wired signals transmitted and received between the gateway apparatus 2 and the power supply apparatus 3 are input and output.

The connection terminal 341 is a connection terminal through which the internal voltage converted by the power supply circuit 33 is input into the gateway apparatus 2 and is electrically connected to the connection terminal 231.

The external power supply 4 is installed at a low location and supplies the external voltage to the power supply apparatus 3 through the cable CE. For example, the external power supply 4 may be a commercial power supply which outputs AC 100V. Alternatively, the external power supply 4 may be a power adapter which converts AC 100V from a commercial power supply into DC 24V and outputs DC 24V.

The external controller 5 is installed at a low location. The external controller 5 transmits wired signals to the power supply apparatus 3 through the cable CD and receives wired signals from the power supply apparatus 3 through the cable CD. The external controller 5 collects various types of information from the wireless field devices 1 by acquiring wired signals and controls the wireless field devices 1 through the power supply apparatus 3 and the gateway apparatus 2 by transmitting wired signals. For example, the external controller 5 may be a distributed control system (DCS), a SCADA system, (SCADA: Supervisory Control and Data Acquisition) or a Programmable Logic Controller (PLC).

Hereinafter, the operation of the wireless communication system A will be described.

Figure 2:
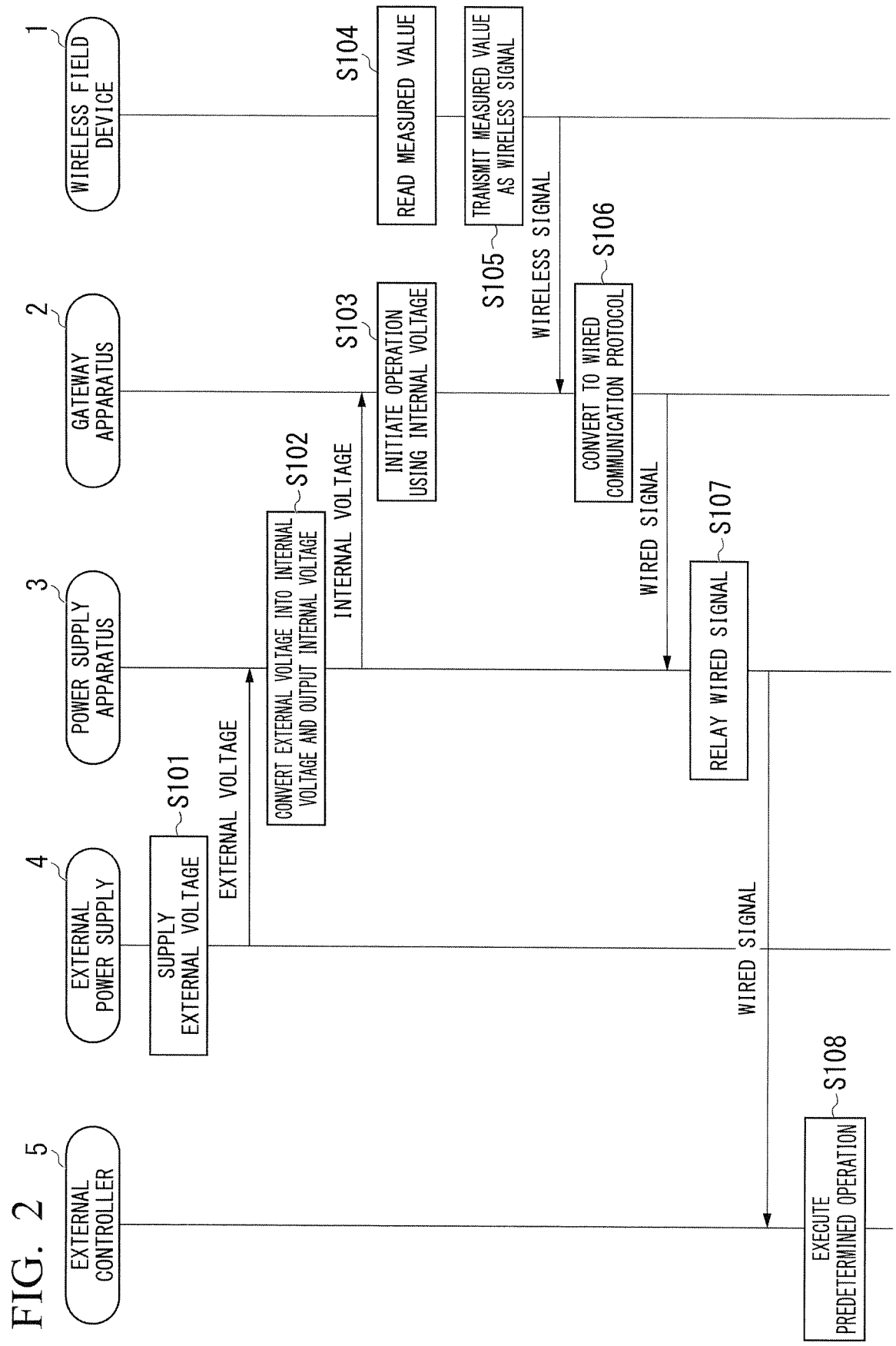
FIG. 2 is a diagram for describing an operation for transmitting a measured value obtained by a wireless field device 1 to an external controller 5 according to the first embodiment.

First, a case in which measured values obtained by the wireless field devices 1 are transmitted to the external controller 5 will be described in detail with reference to FIG. 2.

The external power supply 4 supplies an external voltage to the power supply apparatus 3 through the cable CE (step S101). Then, the external voltage supplied from the external power supply 4 is input into the connection terminal 32. The power supply circuit 33 drops the external voltage input into the connection terminal 32 to a predetermined voltage to generate an internal voltage. Then, the internal voltage generated in the power supply circuit 33 is output from the connection terminal 341 (step S102).

The internal voltage output from the connection terminal 341 is input into the connection terminal 231 of the gateway apparatus 2 installed at a high location through the cable CB. Then, the gateway apparatus 2 initiates an operation using the internal voltage input to the connection terminal 231 (step S103). The gateway apparatus 2 has a smaller size and weight than conventional ones because it does not include a power supply circuit. Accordingly, in a case in which the gateway apparatus 2 is installed at a high location, a relatively inexpensive fixing method can be employed. In addition, installation work can be performed by a smaller number of workers. In this manner, the gateway apparatus 2 can be installed at a high location with decreased workload for installation at low cost.

The wireless field device 1 performs measurement necessary for process control under the control of the external controller 5 (step S104). Then, the wireless field device 1 formats measured values to be conformed with a wireless communication protocol and transmits the formatted measurement values to the gateway apparatus 2 (step S105).

The antenna 21 receives wireless signals transmitted from the wireless field device 1, that is, the measured values formatted to be conformed with the wireless communication protocol, and inputs the wireless signals into the gateway functional unit 22.

The gateway functional unit 22 performs format-conversion of the measured values formatted to be conformed with the wireless communication protocol and received through the antenna 21, to be conformed with a wired communication protocol (step S106). That is, the gateway functional unit 22 converts the wireless signals received through the antenna 21 into the wired signals in conformance with the wired communication protocol. Then, the measured values (wired signals) format-converted to be conformed with the wired communication protocol by the gateway functional unit 22 are output from the connection terminal 230.

The wired signals output from the connection terminal 230 is input into the connection terminal 340 of the power supply apparatus 3 installed at a low location through the cable CB. Since internal power and the wired signals that are a digital signal are transmitted through the cable CB, the wired signals do not become degraded even if the cable CB is lengthened and the gateway apparatus 2 is installed at a high location. Accordingly, it is possible to lengthen the cable CB and to install the antenna 21 in a high location without deteriorating the wireless communication performance between the antenna 21 and the wireless field device 1.

Since the connection terminal 340 and the connection terminal 31 are electrically connected to each other, the wired signals input into the connection terminal 340 is relayed to the connection terminal 31 and transmitted to the external controller 5 through the cable CD. That is, the power supply apparatus 3 relays the wired signals input into the connection terminal 340 to the external controller 5 (step S107). Then, the external controller 5 executes a preset operation on the basis of the relayed wired signal, that is, the measured values format-converted to be conformed with the wired communication protocol (step S108).

Figure 3:
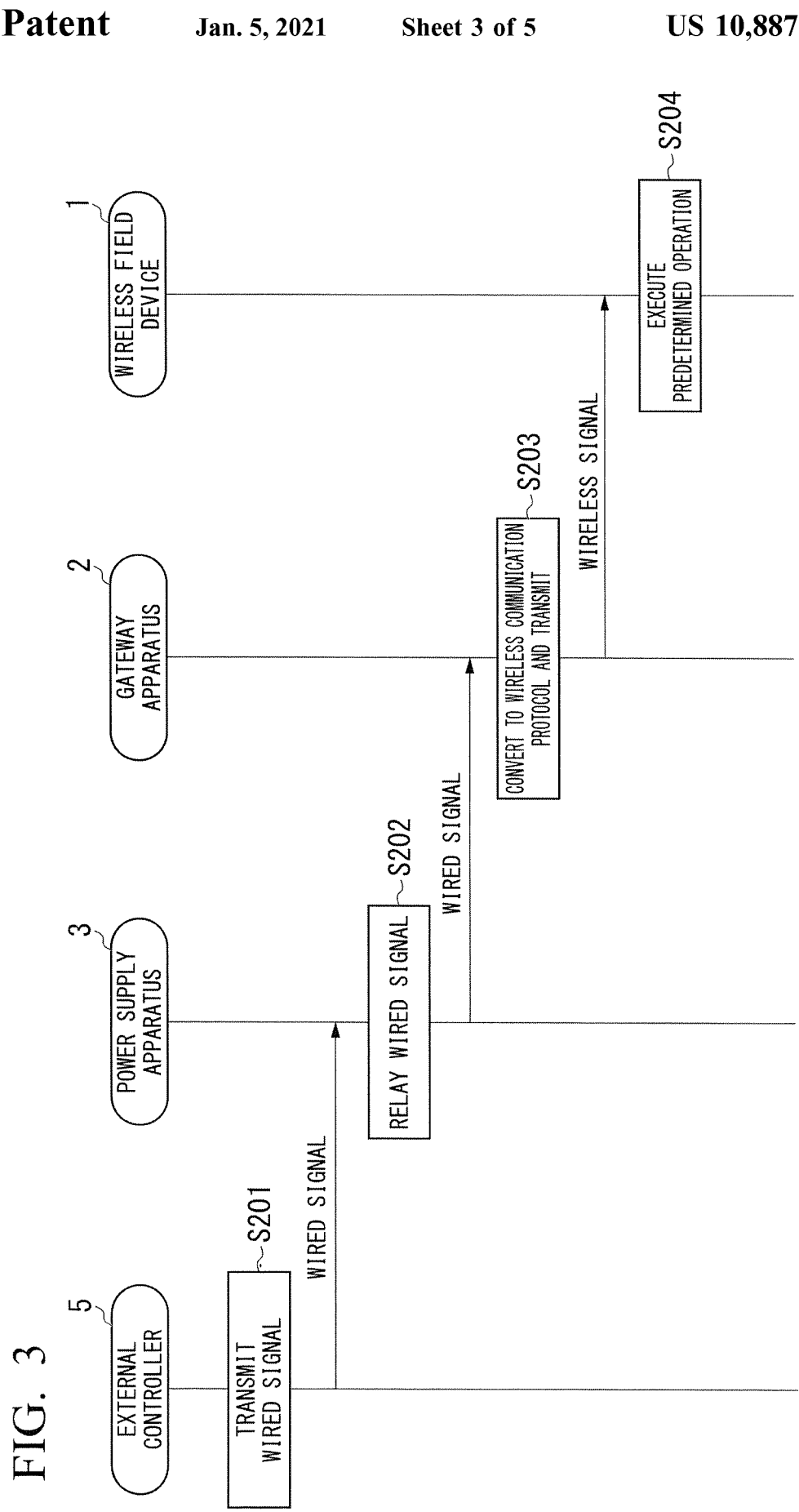
FIG. 3 is a diagram for describing an operation for controlling the wireless field device 1 according to the first embodiment.

Next, an operation when the wireless field device 1 is controlled using the wireless gateway system will be described in detail with reference to FIG. 3. Hereinafter, a case in which the gateway apparatus 2 has already initiated the operation using the internal voltage input into the connection terminal 231 will be described as an example.

The external controller 5 formats a control value of the wireless field device 1 to be conformed with the wired communication protocol. Then, the external controller 5 transmits the control value (wired signal) formatted to be conformed with the wired communication protocol to the power supply apparatus 3 through the cable CD (step S201).

The wired signal transmitted from the external controller 5 is input into the connection terminal 31. Then, the wired signal input into the connection terminal 31 is relayed to the connection terminal 340 and transmitted to the connection terminal 230 of the gateway apparatus 2 through the cable CB. That is, the power supply apparatus 3 relays the wired signal input into the connection terminal 31 to the gateway apparatus 2 (step S202).

The gateway functional unit 22 pertains format-conversion of the wired signal input into the connection terminal 230, that is, the control value formatted to be conformed with the wired communication protocol, to be conformed with the wireless communication protocol. That is, the gateway functional unit 22 converts the wired signal input into the connection terminal 230 into the wireless signal in conformance with the wireless communication protocol. Then, the control value (wireless signal) format-converted to be conformed with the wireless communication protocol by the gateway functional unit 22 is wirelessly transmitted to the wireless field device 1 through the antenna 21 (step S203).

The wireless field device 1 receives the wireless signal from the antenna 21 and executes a predetermined operation on the basis of the control value indicated by the received wireless signal (step S204).

As described above, the wireless gateway system according to the first embodiment includes the gateway apparatus 2 having the gateway function and including the antenna 21 wirelessly communicating with wireless field devices, and the power supply apparatus 3 configured as a separate body from the gateway apparatus 2, that is, the power supply apparatus 3 is separated from the gateway apparatus 2. The power supply apparatus 3 converts a voltage from the external power supply 4 to a predetermined internal voltage, supplies the internal voltage to the gateway apparatus 2, and relays wired signals between the external controller 5 and the gateway apparatus 2. The gateway apparatus 2 operates using the internal voltage supplied from the power supply apparatus 3 for power, converts wireless signals received from the wireless field device 1 to wired signals and transmits the wired signals to the power supply apparatus 3.

Accordingly, it is possible to reduce the size and weight of the gateway apparatus 2 because the gateway apparatus 2 and the power supply apparatus 3 are configured as separate bodies. Therefore, the gateway apparatus 2 can be easily installed at a high location at low cost.

Furthermore, wired signals that are digital signals, instead of high-frequency wireless signals, are transmitted through the cable CB wired between the gateway apparatus 2 installed at a high location and the power supply apparatus 3 installed at a low location, and thus the wired signals are not deteriorated even if the cable CB is extended. Accordingly, it is possible to extend the cable CB and to install the gateway apparatus 2 in a high location without affecting the wireless communication performance with respect to the wireless field device 1.

Second Embodiment

Figure 4:
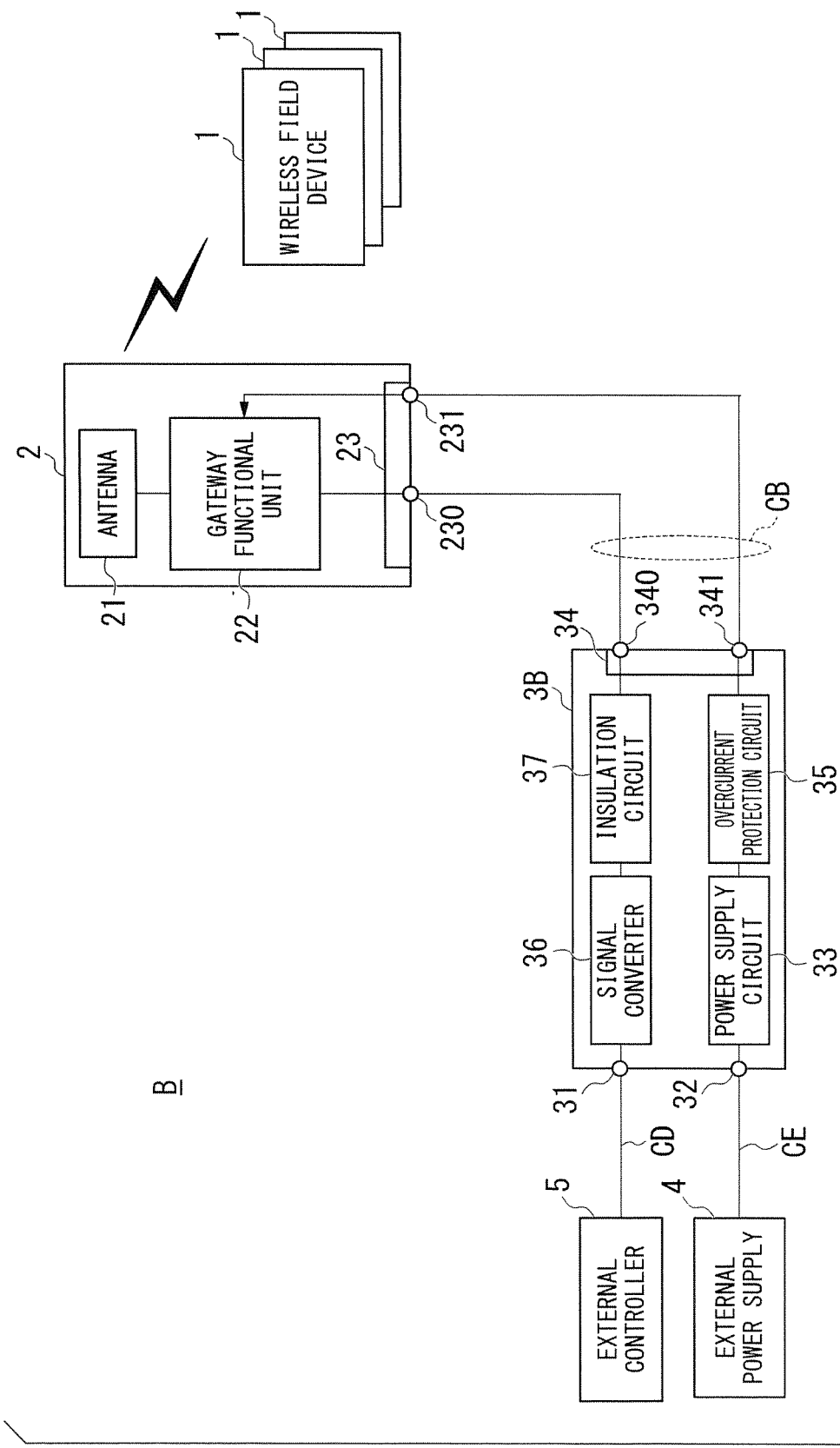
FIG. 4 is a diagram showing an example of a schematic configuration of a wireless communication system B using a wireless gateway system according to a second embodiment.

FIG. 4 is a diagram showing an example of a schematic configuration of a wireless communication system B using a wireless gateway system according to a second embodiment. The same reference numbers will be used to refer to the same or similar parts to those of the wireless communication system A in the drawings and redundant description may be omitted. The wireless gateway system according to the second embodiment includes an overcurrent protection circuit 35, a signal converter 36 and an insulation circuit 37 provided in the power supply apparatus 3 in contrast to the first embodiment.

As shown in FIG. 4, the wireless communication system B includes wireless field devices 1, the gateway apparatus 2, a power supply apparatus 3B, the external power supply 4, and the external controller 5. The "wireless gateway system" according to one or more embodiments of the present invention includes the gateway apparatus 2 and the power supply apparatus 3B.

The power supply apparatus 3B is installed at a low location in consideration of maintainability. The power supply apparatus 3B includes the connection terminals 31 and 32, the power supply circuit 33, the connector 34, the overcurrent protection circuit 35, the signal converter 36 and the insulation circuit 37.

The overcurrent protection circuit 35 stops supply of an internal voltage when the overcurrent protection circuit 35 detects flow of overcurrent from the power supply circuit 33 to the cable CB. For example, the overcurrent flow to the cable CB is caused due to incorrect wiring of the cable CB connected between the gateway apparatus 2 installed at a high location and the power supply apparatus 3 installed at a low location.

The overcurrent protection circuit 35 is positioned between the output of the power supply circuit 33 and the connection terminal 341. The overcurrent protection circuit 35 detects an overcurrent with respect to the gateway apparatus 2 (or the cable CB) when the current output from the power supply circuit 33 is equal to or higher than a predetermined value. Then, the overcurrent protection circuit 35 stops supply of the internal voltage by opening electrical connection between the output of the power supply circuit 33 and the connection terminal 341, for example, when the overcurrent protection circuit 35 detects the overcurrent.

The signal converter 36 is connected between the connection terminal 31 and the connection terminal 340. The signal converter 36 converts wired signals received from the gateway apparatus 2 to signals in conformance with a wired communication protocol (second wired communication protocol) different from the wired communication protocol (first wired communication protocol) converted to through the gateway functional unit 22 and transmits the converted signals to the external controller 5. The second wired communication protocol may employ a Modbus (registered trademark) protocol and HART (registered trademark) protocol, for example, like the first wired communication protocol but it differs from the first wired communication protocol and is a communication protocol used in the external controller 5.

The insulation circuit 37 is connected between the signal converter 36 and the connection terminal 340. The insulation circuit 37 bidirectionally transmits wired signals while electrically insulating the gateway apparatus 2 from the signal converter 36 of the power supply apparatus 3B. Accordingly, the insulation circuit 37 can prevent intrusion of noise from the external controller 5 into the gateway apparatus 2. For example, the insulation circuit 37 may be configured using an element such as a photocoupler.

Hereinafter, an operation in which measured values obtained by the wireless field device 1 are transmitted to the external controller 5 according to the second embodiment will be described in detail with reference to FIG. 5. In an example described below, a case in which the second wired communication protocol used in the external controller 5 is a HART (registered trademark) protocol and the first wired communication protocol is a Modbus (registered trademark) protocol will be described.

The external power supply 4 supplies an external voltage to the power supply apparatus 3B through the cable CE (step S301). Then, the external voltage supplied from the external power supply 4 is input into the connection terminal 32. The power supply circuit 33 drops the external voltage input into the connection terminal 32 to a predetermined voltage to generate an internal voltage. The internal voltage generated by the power supply circuit 33 passes through the overcurrent protection circuit 35 and is output from the connection terminal 341 (step S302). When the current flowing through the overcurrent protection circuit 35 is equal to or higher than a predetermined value, the overcurrent protection circuit 35 stops supply of the internal voltage by opening electrical connection between the output of the power supply circuit 33 and the connection terminal 341.

The internal voltage output from the connection terminal 341 is input into the connection terminal 231 of the gateway apparatus 2 installed at a high location through the cable CB. Then, the gateway apparatus 2 initiates an operation using the internal voltage input into the connection terminal 231 (step S303).

The wireless field device 1 performs measurement necessary for process control under the control of the external controller 5 (step S304). Then, the wireless field device 1 formats measured values to be conformed with a wireless communication protocol and transmits the formatted measured values to the wireless gateway apparatus 2 (step S305).

The antenna 21 receives wireless signals transmitted from the wireless field device 1, that is, the measured values formatted to be conformed with the wireless communication protocol, and inputs the wireless signals into the gateway functional unit 22.

The gateway functional unit 22 performs format-conversion of the measured values, which have been formatted to be conformed with the wireless communication protocol and received through the antenna 21, to be conformed with the first wired communication protocol (step S306). Then, the measured values format-converted to be conformed with the first wired communication protocol by the gateway functional unit 22 is output from the connection terminal 230 and input into the connection terminal 340 of the power supply apparatus 3B installed at a lower location through the cable CB. Since internal power and the wired signals that are digital signals pass through the cable CB as in the first embodiment, the wired signals are not deteriorated even if the gateway apparatus 2 is installed at a high location. Accordingly, it is possible to install the gateway apparatus 2 in a high location by extending the cable CB without deteriorating the wireless communication performance between the antenna 21 and the wireless field device 1.

The measured values based on the first wired communication protocol, input into the connection terminal 340, are transmitted to the signal converter 36 through the insulation circuit 37. The insulation circuit 37 transmits the measured values in conformance with the first wired communication protocol, input to the connection terminal 340, to the signal converter 36 while electrically insulating the gateway apparatus 2 from the signal converter 36 of the power supply apparatus 3B.

The signal converter 36 converts the measured values in conformance with the first wired communication protocol into signals in conformance with the second wired communication protocol and transmits the converted signals to the external controller 5 (step S307). The second wired communication protocol is a HART (registered trademark) protocol like the communication protocol used in the external controller 5. Therefore, in a case in which the first wired communication protocol differs from the communication protocol used in the external controller 5, the measured values formatted to be conformed with the first wired communication protocol by the signal converter 36 is converted into signals in conformance with the second wired communication protocol that is the communication protocol used in the external controller 5. Accordingly, the wireless gateway system according to the second embodiment can transmit the measured values obtained by the wireless field device 1 to the external controller 5 even if the first wired communication protocol differs from the communication protocol used in the external controller 5.

The external controller 5 executes a preset operation on the basis of the measured values format-converted to be conformed with the second wired communication protocol (step S308).

One or more embodiments of the present invention are not limited to the above embodiments and, for example, modified examples below may be conceived.

(1) In the above embodiments, the gateway apparatus 2 may include a power supply monitor which monitors the internal voltage. The power supply monitor notifies the external controller 5 of an abnormality through the gateway apparatus 2 in a case in which the internal voltage deviates from a predetermined range. Such an abnormality notification is transmitted to the power supply apparatus 3 through the cable CB. Then, the power supply apparatus 3 relays such an abnormality notification to the external controller 5. Accordingly, in a case in which the power supply circuit 33 cannot supply the internal voltage to the gateway apparatus 2 for a certain reason, the gateway apparatus 2 can notify the external controller 5 of the abnormality through the cable CB.

(2) In the above embodiments, the gateway apparatus 2 may be a module having an external shape, such as a cylindrical shape or a polygonal column shape (e.g., square column shape). In this case, the antenna 21 is disposed at the other end of the housing of the gateway apparatus 2 having a column shape. The other end of the housing of the gateway apparatus 2 is the end opposite the connector 23 installed at one end of the housing of the gateway apparatus 2.

(3) In the above embodiments, the inside of the gateway apparatus 2 may be filled with a resin to satisfy the intrinsically safe explosion-proof standard. That is, each component of the gateway functional unit 22 accommodated inside of the housing of the gateway apparatus 2 is sealed by the resin filled into the housing. In a case in which the cost and weight of the gateway apparatus 2 are increased due to the filling of the resin into the housing, the inside of the housing may not be filled with the resin and the gateway apparatus 2 may be partially filled with the resin such that only the surface of the gateway functional unit 22 is coated with the resin.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A wireless gateway system comprising:
  a gateway apparatus having a gateway function and comprising an antenna that wirelessly communicates with a wireless field device;
  a power supply apparatus separated from the gateway apparatus and positioned between the gateway apparatus and an external controller; and
  a power line and a signal line that connect the gateway apparatus and the power supply apparatus, wherein
  the power supply apparatus:
    converts a voltage from an external power supply to a predetermined internal voltage, supplies the internal voltage to the gateway apparatus through the power line,
    relays a wired signal in conformance with a first wired communication protocol between the external controller and the gateway apparatus through the signal line,
    relays, to the gateway apparatus through the signal line, the wired signal received from the external controller, and
    relays, to the external controller, the wired signal received from the gateway apparatus through the signal line,
  the gateway apparatus, upon receiving the internal voltage from the power supply apparatus, converts a wireless signal in conformance with a wireless communication protocol received from the wireless field device through the antenna to a wired signal in conformance with the first wired communication protocol, and transmits the converted wired signal to the power supply apparatus through the signal line, and the power supply apparatus comprises a signal converter that:
   converts the wired signal received from the gateway apparatus through the signal line to a wired signal in conformance with a second wired communication protocol different from the first wired communication protocol; and
   relays the converted wired signal to the external controller.

2. The wireless gateway system according to claim 1, wherein the power supply apparatus further comprises: an overcurrent protection circuit that stops supply of the internal voltage in response to detecting an overcurrent through the power line.

3. The wireless gateway system according to claim 1, wherein the power supply apparatus further comprises: an insulation circuit that bidirectionally relays the wired signal between the external controller and the gateway apparatus while electrically insulating the external controller from the gateway apparatus.

4. The wireless gateway system according to claim 1, wherein the gateway apparatus converts a wired signal received from the power supply apparatus through the signal line to a wireless signal and transmits the converted wireless signal to the wireless field device through the antenna.

5. The wireless gateway system according to claim 1, wherein the gateway apparatus is positioned higher than the power supply apparatus to enable communication with the wireless field device.

6. The wireless gateway system according to claim 1, wherein the power supply apparatus comprises: a power supply circuit that converts the voltage from the external power supply to the internal voltage and supplies the internal voltage to the gateway apparatus through the power line.

7. A communication method of a wireless gateway system comprising a gateway apparatus that has a gateway function and comprising an antenna that wirelessly communicates with a wireless field device, a power supply apparatus separated from the gateway apparatus and positioned between the gateway apparatus and an external controller, and a power line and a signal line that connect the gateway apparatus and the power supply apparatus, the communication method comprising:
   converting a voltage from an external power supply to a predetermined internal voltage;
   supplying the internal voltage from the power supply apparatus to the gateway apparatus through the power line;
   converting a wireless signal in conformance with a wireless communication protocol received from the wireless field device through the antenna to a wired signal in conformance with a first wired communication protocol;
   transmitting the wired signal from the gateway apparatus to the power supply apparatus through the signal line; and
   relaying, to the external controller, the wired signal transmitted from the gateway apparatus to the power supply apparatus through the signal line; and
   relaying, to the gateway apparatus through the signal line, the wired signal transmitted from the external controller to the power supply apparatus, wherein
   the communication method further comprises:
      converting the wired signal received from the gateway apparatus to the power supply apparatus through the signal line to a wired signal in conformance with a second wired communication protocol different from the first wired communication protocol; and
      relaying the converted wired signal to the external controller.

8. The communication method of the wireless gateway system according to claim 7, further comprising: stopping supply of the internal voltage in response to detecting overcurrent through the power line.

9. The communication method of the wireless gateway system according to claim 7, wherein the wired signal transmitted from the gateway apparatus to the power supply apparatus through the signal line is relayed to the external controller while electrically insulating the external controller from the gateway apparatus.

10. The communication method of the wireless gateway system according to claim 7, further comprising:
   converting a wired signal transmitted from the power supply apparatus to the gateway apparatus through the signal line to a wireless signal in conformance with the wireless communication protocol, and
   transmitting the converted wireless signal to the wireless field device through the antenna.

11. The communication method of the wireless gateway system according to claim 7, wherein the gateway apparatus is positioned higher than the power supply apparatus to enable communication with the wireless field device.

* * * * *